US012641647B2

(12) United States Patent
Zewail et al.

(10) Patent No.: US 12,641,647 B2
(45) Date of Patent: May 26, 2026

(54) SCHEDULING COLLISION HANDLING WITH MULTIPLE TRANSMIT RECEIVE POINTS

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 18/189,817

(22) Filed: Mar. 24, 2023

(65) Prior Publication Data

US 2024/0324016 A1     Sep. 26, 2024

(51) Int. Cl.
H04W 74/0808     (2024.01)
H04W 72/231     (2023.01)
H04W 72/50     (2023.01)

(52) U.S. Cl.
CPC ..... H04W 74/0825 (2013.01); H04W 72/231 (2023.01); H04W 72/535 (2023.01)

(58) Field of Classification Search
CPC ..... H04L 5/0055; H04L 5/0098; H04L 5/001; H04L 5/0051; H04L 5/0094; H04W 72/232; H04W 72/0446; H04W 72/0457; H04W 72/1268
USPC ........................................ 370/328, 329, 330
See application file for complete search history.

(56) References Cited

U.S. PATENT DOCUMENTS

| | | | | |
|---|---|---|---|---|
| 10,880,895 B2 * | 12/2020 | Gordaychik | .......... | H04W 52/58 |
| 11,870,732 B2 * | 1/2024 | Wang | .................... | H04L 5/0055 |
| 2018/0227886 A1 * | 8/2018 | Chou | .................. | H04W 72/046 |
| 2020/0313732 A1 * | 10/2020 | Yang | ................. | H04W 72/0473 |
| 2022/0191906 A1 * | 6/2022 | Sengupta | .............. | H04W 72/23 |
| 2023/0082996 A1 * | 3/2023 | Sarkis | .................. | H04L 1/1854 |
| | | | | 370/329 |

FOREIGN PATENT DOCUMENTS

| | | | | | |
|---|---|---|---|---|---|
| KR | 20230160814 A | * | 11/2023 | .......... | H04W 72/232 |
| WO | WO-2022084976 A1 | * | 4/2022 | ............ | H04L 1/189 |
| WO | WO-2022213291 A1 | | 10/2022 | | |

OTHER PUBLICATIONS

International Search Report and Written Opinion—PCT/US2024/020067—ISA/EPO—Jun. 3, 2024.

* cited by examiner

*Primary Examiner* — David Q Nguyen
(74) *Attorney, Agent, or Firm* — QUALCOMM Incorporated

(57)     ABSTRACT

Various aspects of the present disclosure generally relate to wireless communication. In some aspects, a user equipment (UE) may receive a first scheduling message from a first transmit receive point (TRP) and a second scheduling message from a second TRP. The UE may detect a scheduling collision based at least in part on a first scheduled communication of the first scheduling message and a second scheduled communication of the second scheduling message overlapping in time. The UE may selectively transmit one or more of the first scheduled communication or the second scheduled communication based at least in part on the detecting the scheduling collision. Numerous other aspects are described.

10 Claims, 8 Drawing Sheets

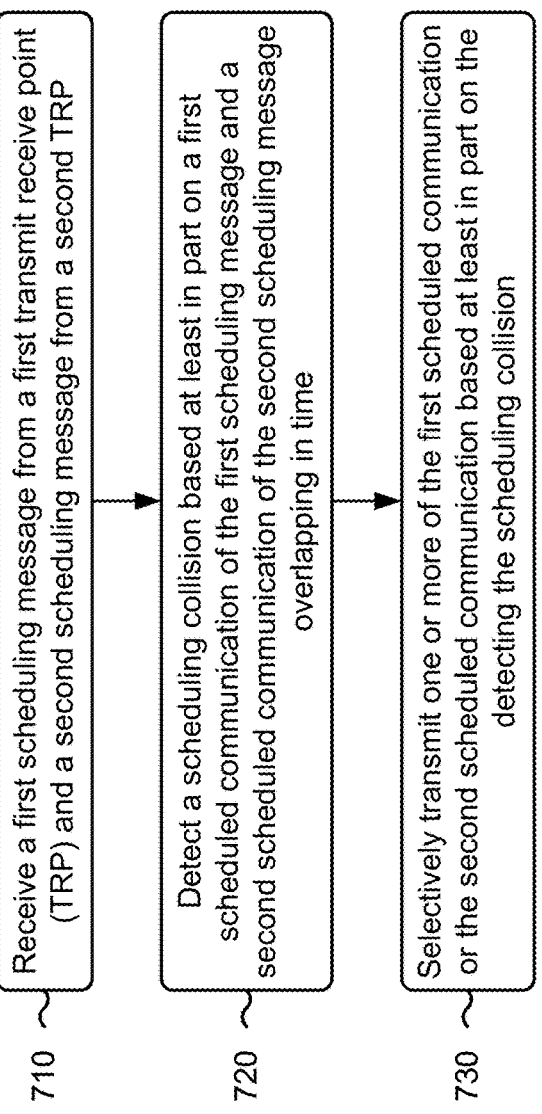

700

710 Receive a first scheduling message from a first transmit receive point (TRP) and a second scheduling message from a second TRP 720 Detect a scheduling collision based at least in part on a first scheduled communication of the first scheduling message and a second scheduled communication of the second scheduling message overlapping in time 730 Selectively transmit one or more of the first scheduled communication or the second scheduled communication based at least in part on the detecting the scheduling collision

FIG. 7

SCHEDULING COLLISION HANDLING WITH MULTIPLE TRANSMIT RECEIVE POINTS

FIELD OF THE DISCLOSURE

Aspects of the present disclosure generally relate to wireless communication and to techniques and apparatuses for handling collisions with multiple transmit receive points.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a first scheduling message from a first transmit receive point (TRP) and a second scheduling message from a second TRP. The method may include detecting a collision based at least in part on a first scheduled communication of the first scheduling message and a second scheduled communication of the second scheduling message overlapping in time. The method may include selectively transmitting one or more of the first scheduled communication or the second scheduled communication based at least in part on the detecting the collision.

Some aspects described herein relate to a UE for wireless communication. The UE may include a memory and one or more processors coupled to the memory. The one or more processors may be configured to receive a first scheduling message from a first TRP and a second scheduling message from a second TRP. The one or more processors may be configured to detect a collision based at least in part on a first scheduled communication of the first scheduling message and a second scheduled communication of the second scheduling message overlapping in time. The one or more processors may be configured to selectively transmit one or more of the first scheduled communication or the second scheduled communication based at least in part on the detecting the collision.

Some aspects described herein relate to a non-transitory computer-readable medium that stores a set of instructions for wireless communication by a UE. The set of instructions, when executed by one or more processors of the UE, may cause the UE to receive a first scheduling message from a first TRP and a second scheduling message from a second TRP. The set of instructions, when executed by one or more processors of the UE, may cause the UE to detect a collision based at least in part on a first scheduled communication of the first scheduling message and a second scheduled communication of the second scheduling message overlapping in time. The set of instructions, when executed by one or more processors of the UE, may cause the UE to selectively transmit one or more of the first scheduled communication or the second scheduled communication based at least in part on the detecting the collision.

Some aspects described herein relate to an apparatus for wireless communication. The apparatus may include means for receiving a first scheduling message from a first TRP and a second scheduling message from a second TRP. The apparatus may include means for detecting a collision based at least in part on a first scheduled communication of the first scheduling message and a second scheduled communication of the second scheduling message overlapping in time. The apparatus may include means for selectively transmitting one or more of the first scheduled communication or the second scheduled communication based at least in part on the detecting the collision.

Aspects generally include a method, apparatus, system, computer program product, non-transitory computer-readable medium, UE, base station, TRP, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers. modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a UE, in accordance with the present disclosure.

DETAILED DESCRIPTION

Figure 1:
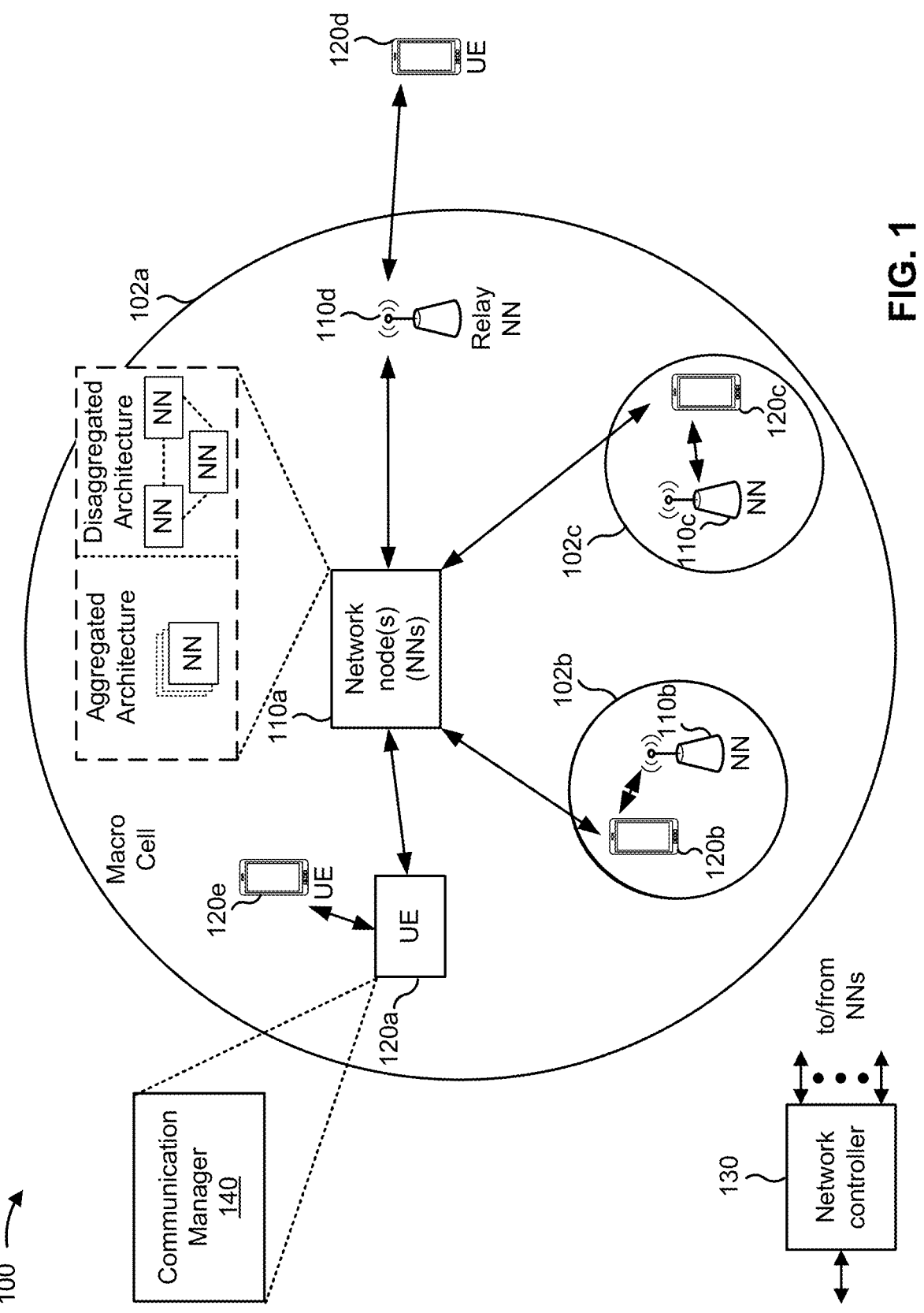
FIG. 1 is a diagram illustrating an example of a wireless network, in accordance with the present disclosure.

A user equipment (UE) may communicate with multiple transmit receive points (TRPs) that are controlled by a network entity. The multiple TRPs may coordinate to avoid collisions when scheduling communications and providing grants to UEs. In one scenario, the multiple TRPs may dynamically coordinate the use of resources to avoid collisions. The multiple TRPs may use a fast backhaul between TRPs. In another scenario, the multiple TRPs may use conservative scheduling with slow coordination. For example, if a UE cannot receive multiple unicast physical downlink shared channel (PDSCH) communications at the same time, the TRPs coordinate to communicate with the UE using time division multiplexing (TDM). One technique is for a first TRP to use even time slots and a second TRP to use odd time slots. This technique will work at the cost of throughput, because if the first TRP does not use an even slot, the second TRP cannot use the even slot and the time slot is wasted. If many time slots are wasted, throughput decreases and latency increases. In either scenario, it is each TRP's responsibility to avoid a scheduling collision where one scheduled communication will overlap in time (e.g., same time slot) with another scheduled communication.

According to various aspects described herein, TRPs may not follow a requirement for inter-TRP coordination (e.g., orthogonality) and may allow for scheduling collisions at a UE. A scheduling collision may occur if a scheduled communication from a first TRP overlaps in time with a scheduled communication from a second TRP. A scheduling collision may occur if a serving operation exceeds a capability of the UE to transmit or receive a scheduled communication. In some aspects, the TRPs may schedule communications that overlap in time and the UE may detect and handle a scheduling collision. The UE may detect the scheduling collision based at least in part on scheduling messages (e.g., downlink control information (DCI) in a physical downlink control channel message (PDCCH), a radio resource control (RRC) configuration) from the multiple TRPs. The UE may handle a scheduling collision by adjusting communications. This may include dropping or downgrading one or both scheduled communications. By allowing for and handling scheduling collisions from multiple TRPs, the UE may not be blocked from using a resource for a first TRP that is reserved by a second TRP. More time slots are used and less signaling resources are wasted. This improves the throughput for the multiple TRPs and decreases latency.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an CNB (e.g., in 4G), a gNB (e.g., in 5G), an access point, a TRP, a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., a UE 120) may include a communication manager 140. As described in more detail elsewhere herein, the communication manager 140 may receive a first scheduling message from a first TRP and a second scheduling message from a second TRP. The communication manager 140 may detect a scheduling collision based at least in part on a first scheduled communication of the first scheduling message and a second scheduled communication of the second scheduling message overlapping in time. The communication manager 140 may selectively transmit one or more of the first scheduled communication or the second scheduled communication based at least in part on the detecting the scheduling collision. Additionally, or alternatively, the communication manager 140 may perform one or more other operations described herein.

As indicated above, FIG. 1 is provided as an example. Other examples may differ from what is described with regard to FIG. 1.

Figure 2:
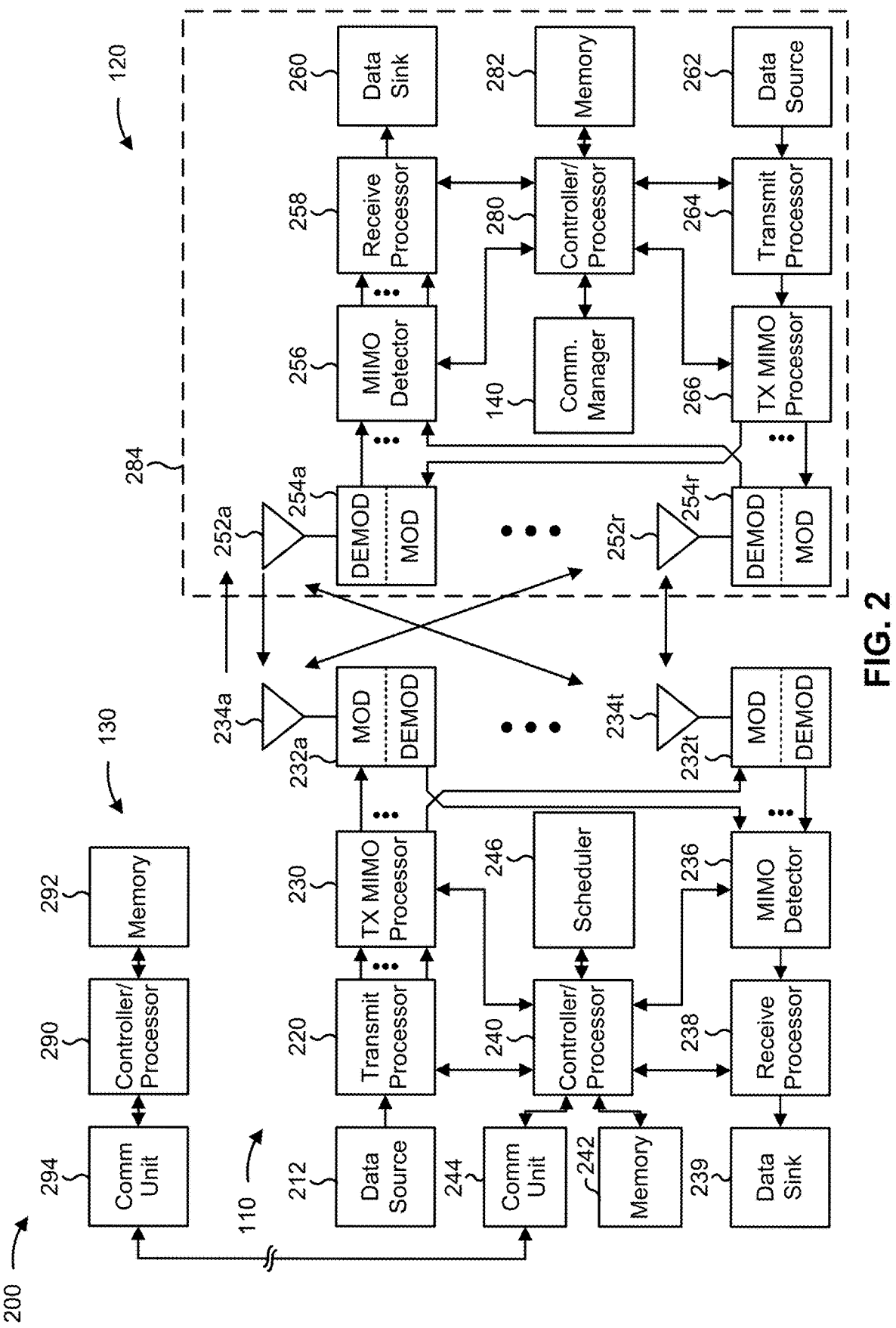
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 2-8).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 2-8).

A controller/processor of a network entity (e.g., controller/processor 240 of the network node 110), the controller/processor 280 of the UE 120, and/or any other component(s) of FIG. 2 may perform one or more techniques associated with handling scheduling collisions with multiple TRPs, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, and/or other processes as described herein. In some examples, executing instructions may include running the instructions, converting the instructions, compiling the instructions, and/or interpreting the instructions, among other examples.

In some aspects, a UE (e.g., a UE 120) includes means for receiving a first scheduling message from a first TRP and a second scheduling message from a second TRP; means for detecting a scheduling collision based at least in part on a first scheduled communication of the first scheduling message and a second scheduled communication of the second scheduling message overlapping in time; and/or means for selectively transmitting one or more of the first scheduled communication or the second scheduled communication based at least in part on the detecting the scheduling collision. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
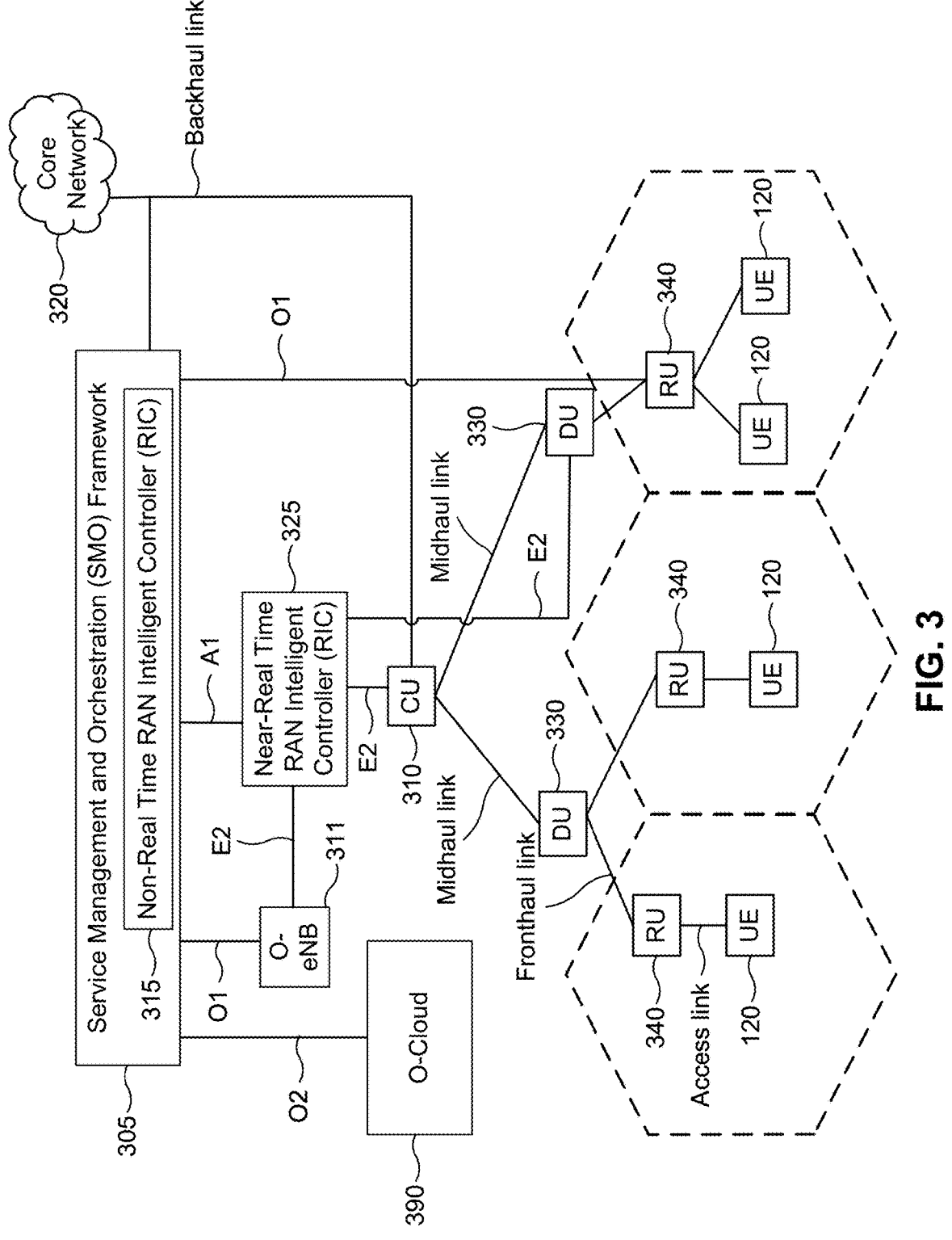
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
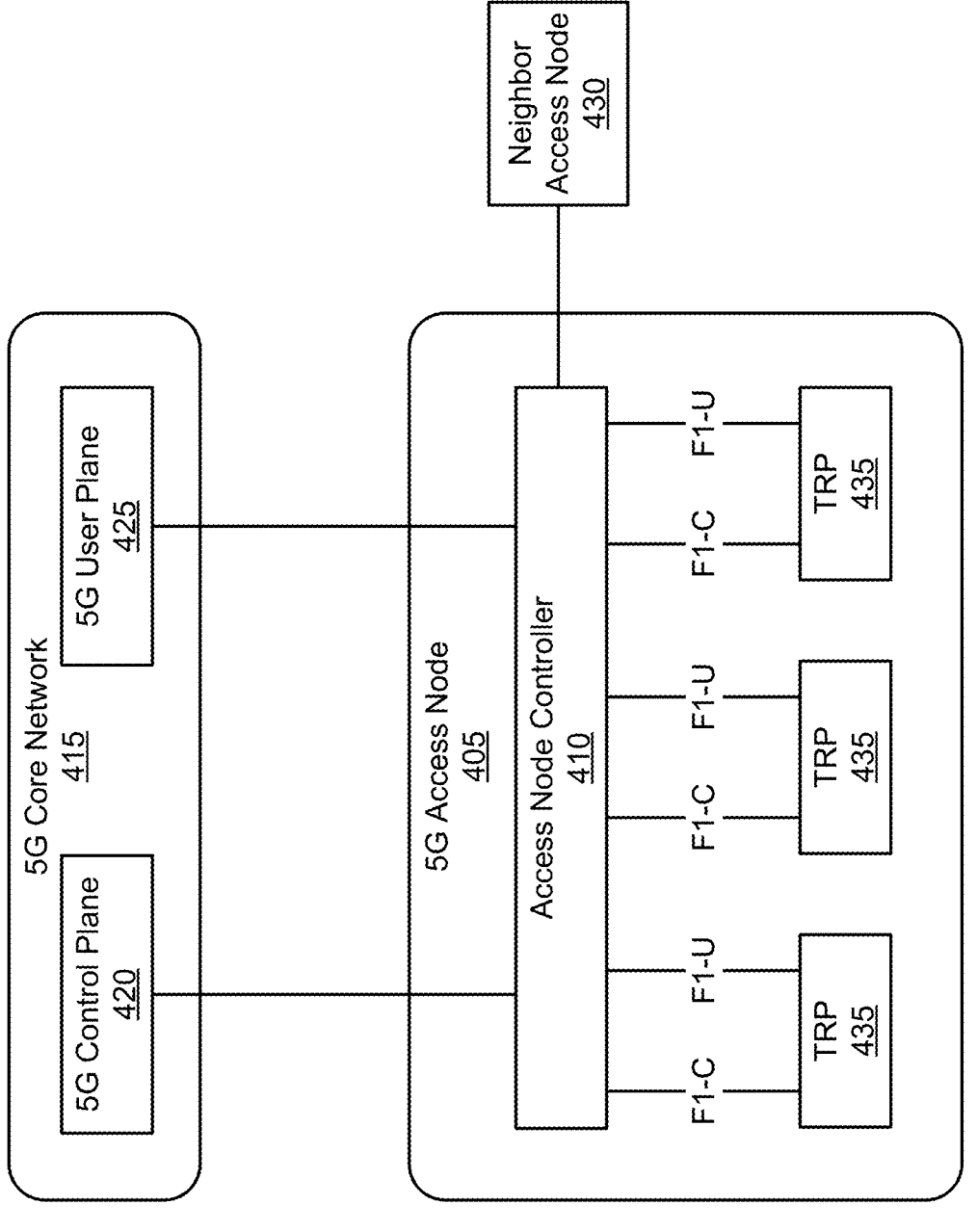
FIG. 4 illustrates an example logical architecture of a distributed random access network, in accordance with the present disclosure.

FIG. 4 illustrates an example logical architecture of a distributed RAN 400, in accordance with the present disclosure.

A 5G access node 405 may include an access node controller 410. The access node controller 410 may be a CU of the distributed RAN 400. In some aspects, a backhaul interface to a 5G core network 415 may terminate at the access node controller 410. The 5G core network 415 may include a 5G control plane component 420 and a 5G user plane component 425 (e.g., a 5G gateway), and the backhaul interface for one or both of the 5G control plane and the 5G user plane may terminate at the access node controller 410. Additionally, or alternatively, a backhaul interface to one or more neighbor access nodes 430 (e.g., another 5G access node 405 and/or an LTE access node) may terminate at the access node controller 410.

The access node controller 410 may include and/or may communicate with one or more TRPs 435 (e.g., via an F1 Control (F1-C) interface and/or an F1 User (F1-U) interface). A TRP 435 may include a DU and/or a RU of the distributed RAN 400. In some aspects, a TRP 435 may correspond to a network node 110 described above in connection with FIG. 1. For example, different TRPs 435 may be included in different network nodes 110. Additionally, or alternatively, multiple TRPs 435 may be included in a single network node 110. In some aspects, a network node 110 may include a CU (e.g., access node controller 410) and/or one or more DUs (e.g., one or more TRPs 435). In some cases, a TRP 435 may be referred to as a cell, a panel, an antenna array, or an array.

A TRP 435 may be connected to a single access node controller 410 or to multiple access node controllers 410. In some aspects, a dynamic configuration of split logical functions may be present within the architecture of distributed RAN 400, referred to elsewhere herein as a functional split. For example, a PDCP layer, an RLC layer, and/or a MAC layer may be configured to terminate at the access node controller 410 or at a TRP 435.

In some aspects, multiple TRPs 435 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 435 may be configured to individually (e.g., using dynamic selection) or jointly (e.g., using joint transmission with one or more other TRPs 435) serve traffic to a UE 120.

As indicated above, FIG. 4 is provided as an example. Other examples may differ from what was described with regard to FIG. 4.

Figure 5:
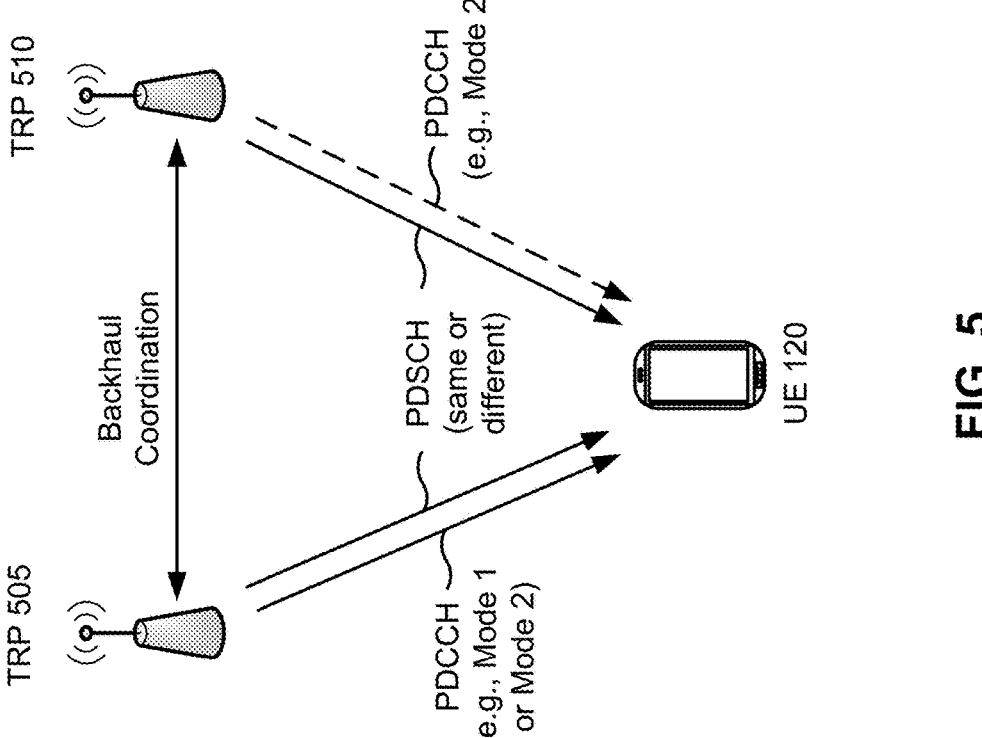
FIG. 5 is a diagram illustrating an example of multiple transmit receive point communication, in accordance with the present disclosure.

FIG. 5 is a diagram illustrating an example 500 of multi-TRP communication (sometimes referred to as multi-panel communication), in accordance with the present disclosure. As shown in FIG. 5, multiple TRPs may communicate with the same UE 120. A TRP may correspond to a TRP 435 described above in connection with FIG. 4.

The multiple TRPs (shown as TRP 505 and TRP 510) may communicate with the same UE 120 in a coordinated manner (e.g., using coordinated multipoint transmissions) to improve reliability and/or increase throughput. The TRPs may coordinate such communications via an interface between the TRPs (e.g., a backhaul interface and/or an access node controller 410). The interface may have a smaller delay and/or higher capacity when the TRPs are co-located at the same network node 110 (e.g., when the TRPs are different antenna arrays or panels of the same network node 110), and may have a larger delay and/or lower capacity (as compared to co-location) when the TRPs are located at different network nodes 110. The different TRPs may communicate with the UE 120 using different QCL relationships (e.g., different TCI states), different DMRS ports, and/or different layers (e.g., of a multi-layer communication).

In a first multi-TRP transmission mode (e.g., Mode 1), a single PDCCH may be used to schedule downlink data communications for a single PDSCH. In this case, multiple TRPs (e.g., TRP 505 and TRP 510) may transmit communications to the UE 120 on the same PDSCH. For example, a communication may be transmitted using a single codeword with different spatial layers for different TRPs (e.g., where one codeword maps to a first set of layers transmitted by TRP 505 and maps to a second set of layers transmitted by TRP 510). As another example, a communication may be transmitted using multiple codewords, where different codewords are transmitted by different TRPs (e.g., using different sets of layers). In either case, different TRPs may use different QCL relationships (e.g., different TCI states) for different DMRS ports corresponding to different layers. For example, TRP 505 may use a first QCL relationship or a first TCI state for a first set of DMRS ports corresponding to a first set of layers, and TRP 510 may use a second (different) QCL relationship or a second (different) TCI state for a second (different) set of DMRS ports corresponding to a second (different) set of layers. In some aspects, a TCI state in DCI (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by TRP 505, and a second PDCCH may schedule a second codeword to be transmitted by TRP 510. Furthermore, first DCI (e.g., transmitted by TRP 505) may schedule a first PDSCH communication associated with a first set of DMRS ports with a first QCL relationship (e.g., indicated by a first TCI state) for TRP 505, and second DCI (e.g., transmitted by TRP 510) may schedule a second PDSCH communication associated with a second set of DMRS ports with a second QCL relationship (e.g., indicated by a second TCI state) for TRP 510. In this case, DCI (e.g., having DCI format 1_0 or DCI format 1_1) may indicate a corresponding TCI state for a TRP corresponding to the DCI. The TCI field of a DCI indicates the corresponding TCI state (e.g., the TCI field of the first DCI indicates the first TCI state and the TCI field of the second DCI indicates the second TCI state).

The multiple TRPs may coordinate to avoid collisions when scheduling communications and providing grants to UEs. In one scenario, the multiple TRPs may dynamically coordinate the use of resources to avoid collisions. The multiple TRPs may use a fast backhaul between TRPs. In another scenario, the multiple TRPs may use conservative scheduling with slow coordination (RRC level). For example, if a UE cannot receive multiple unicast PDSCH communications at the same time, the TRPs coordinate to communicate with the UE using TDM. One technique is for TRP 505 to use even time slots and TRP 510 to use odd time slots. This technique will work, but at the cost of throughput, because if TRP 505 does not use an even slot, TRP 510 cannot use the even slot and the time slot is wasted. If many time slots are wasted, throughput decreases and latency increases. In either scenario, it is each TRP's responsibility to avoid a scheduling collision, which is when one scheduled communication will overlap in time (e.g., same time slot) with another scheduled communication.

As indicated above, FIG. 5 is provided as an example. Other examples may differ from what is described with respect to FIG. 5.

Figure 6:
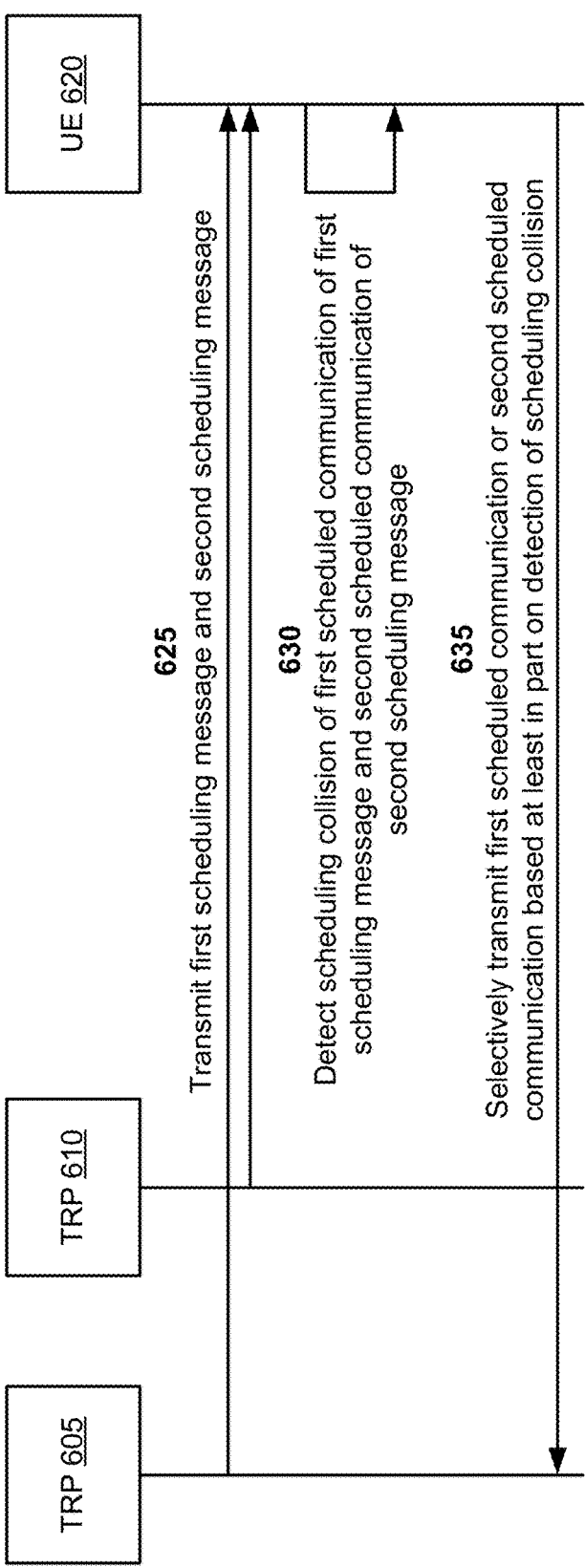
FIG. 6 is a diagram illustrating an example associated with detecting and handling scheduling collisions, in accordance with the present disclosure.

FIG. 6 is a diagram illustrating an example 600 associated with detecting and handling scheduling collisions, in accordance with the present disclosure. As shown in FIG. 6, a first TRP 605 (e.g., TRP 435, TRP 505) and a second TRP 610 (e.g., TRP 435, TRP 510) of a network entity (e.g., network node 110) may communicate with a UE 620 (e.g., a UE 120) in a wireless communication network (e.g., wireless network 100).

According to various aspects described herein, TRPs may not follow a requirement for inter-TRP coordination (e.g., orthogonality) and may allow for scheduling collisions at UEs. A scheduling collision may occur if a scheduled communication from a first TRP overlaps in time with a scheduled communication from a second TRP. A scheduling collision may occur if a serving operation exceeds a capability of the UE to transmit or receive a scheduled communication. In some aspects, the TRPs may schedule communications that overlap in time and a UE may detect and handle a collision. The UE may detect a scheduling collision based at least in part on scheduling messages (e.g., DCI in a PDCCH communication) from multiple TRPs. The UE may handle a scheduling collision by adjusting communications. This may include dropping or downgrading a scheduled communication. By allowing for and handling scheduling collisions, the UE may not be blocked from using a resource for a first TRP that is reserved by a second TRP. More time slots are used and less signaling resources are wasted. This improves the throughput for multiple TRPs and decreases latency.

As shown by reference number 625, TRP 605 may transmit a first scheduling message and TRP 610 may transmit a second scheduling message. The first scheduling message may include DCI in a physical uplink control channel (PUCCH) communication or an RRC message that schedules a configured grant (CG) occasion, a semi-persistent scheduling (SPS) occasion, or a periodic resource. The second scheduling message may include DCI in a PUCCH communication or an RRC message that schedules a CG occasion, an SPS occasion, or a periodic resource. The UE 620 may receive the first scheduling message and the second scheduling message. The UE 620 may be configured to expect that scheduling collisions can occur between multiple TRPs, such as between TRP 605 and TRP 610.

In some aspects, the first scheduling message may include a first DCI (e.g., in a first PDCCH communication) and the second schedule messaging may include a second DCI (e.g., in a second PDCCH communication). In some aspects, the first scheduling message may include a first RRC message and the second schedule messaging may include a second RRC message. The first RRC message may configure the UE 620 with a first configuration, such as a CG configuration or an SPS configuration. The second RRC message may configure the UE 620 with a second configuration, such as a CG configuration or an SPS configuration. In some aspects, the UE 620 may receive a DCI from a TRP that overrides a previous RRC configuration for the TRP. The scheduling messages may indicate uplink grants and/or downlink grants.

As shown by reference number 630, the UE 620 may detect a scheduling collision of a first scheduled communication of the first scheduling message and a second scheduled communication of the second scheduling message. The scheduling collision may occur if the first scheduled communication and the second scheduled communication are to overlap in time, such as in the same time slot. The UE 620 may detect the scheduling collision by comparing the scheduling messages. For example, by comparing a timing (e.g., granted time resource) of the first scheduled communication indicated by a first DCI and a timing of the second scheduled communication indicated by a second DCI, the UE 620 may detect a scheduling collision from the DCIs.

In some aspects, the UE 620 may detect a scheduling collision further based at least in part on a capability of the UE for handling messages that overlap in time. For example, the UE 620 may receive two scheduling messages from TRP 605 and TRP 610 for scheduled communications that overlap in time, but can be frequency division multiplexed (FDMed). However, if the scheduled communications have a total rank of 4 and the UE 620 has a capability of a maximum rank of 3, the UE 620 cannot handle both scheduled communications, and there will be a scheduling collision.

An example of a scheduling collision that exceeds a UE capability may include receiving two unicast PDSCH communications at the same time. The UE 620 may, as a scheduling event, receive DCIs from TRPs that schedule two time overlapping PDSCH communications. The UE 620 may not have a capability to receive two partially overlapping unicast PDSCH communications. Another example of a scheduling collision that exceeds a UE capability may include transmitting simultaneous PUCCH communications at the same time. The UE 620 may, as a scheduling event, receive DCIs from TRPs that schedule two time overlapping PUCCH communications. Scheduling messages may or may not collide with the scheduled communications (e.g., DCI).

In some aspects, one of the scheduling messages may be an RRC message and the other scheduling message may be a DCI. There are different scenarios for a mix of scheduling message types. In a first scenario, the UE 620 may assume that TRPs are coordinated such that there will be no scheduling collision. That is, one TRP communicates to the other TRP about its RRC configured downlink or uplink transmission for a UE, such that the other TRP will not make dynamic scheduling decisions that lead to a collision. From the UE 620's perspective, any scheduling collision is treated as an error case. In a second scenario, the UE 620 may treat an RRC configured downlink or uplink transmission the same as a dynamic granted downlink or uplink transmission. That is, the TRPs may independently configure RRC downlink or uplink resources and rely on collision detection by the UE 620 to resolve any scheduling collisions. Given that both sides are RRC configured, the collision information is known well ahead of time. However, since a TRP may send a dynamic grant to replace a configured grant, a possible collision from an RRC configuration may become no collision later. Thus, the collision detection is still dynamic. In a third scenario, since there is coordination between TRPs on RRC configured resources, and one TRP still sends a dynamic downlink or uplink grant that leads to a scheduling collision, there may be a reason for the dynamic grant. The reason may be that the dynamic grant is for high priority traffic. The UE 620 may allow a dynamically granted communication to take priority and drop the RRC configured scheduled communication.

In some aspects, both of the scheduling messages may be RRC messages. There are different scenarios when the scheduling messages are RRC messages. In a first scenario, the TRPs may be coordinated such that there will be no collision between two scheduled communications that are scheduled as part of RRC configurations. That is, the TRPs communicate with each other when configuring resources (e.g., schedule communications such that scheduling collisions from RRC configured resources are not allowed). From a perspective of the UE 620, a scheduling collision will be treated as an error case. In a second scenario, the RRC scheduling messages may be treated the same as DCI scheduling messages. That is, the TRPs may independently configure resources and rely on collision detection at the UE 620 to resolve scheduling collisions. Given that communications with both TRPs are RRC configured, collision information is known well ahead of time. However, since a TRP may send a dynamic grant to replace a configured grant, a collision from an RRC configuration may become no collision later. Thus, the collision detection is still dynamic.

The UE 620 may handle scheduling collisions. As shown by reference number 635, the UE 620 may selectively transmit the first scheduled communication or the second scheduled communication based at least in part on the detection of the scheduling collision. In some aspects, if there is a scheduling collision and the UE is not capable of handling both scheduled communications, the UE 620 may transmit either the first scheduled communication or the second scheduled communication (not both scheduled communications). That is, the UE 620 may drop one or both of the scheduled communications. Dropping a scheduled communication may include refraining from transmitting the scheduled communication. In some aspects, the UE 620 may drop a scheduled communication that has a lower priority after comparing priorities (e.g., TRP priorities). TRP priorities may be determined based at least in part on TRP indices. TRP priorities may be fixed (e.g., TRP 605 has higher priority than TRP 610) or time varied (e.g., TRP 605 has priority in odd slots, TRP 610 has priority in even slots).

In some aspects, the UE 620 may drop a scheduled communication based at least in part on a configured rule.

For example, the UE 620 may drop a scheduled communication that has a lower traffic priority after comparing traffic priorities. The UE 620 may drop a scheduled communication that has a lower spectrum efficiency (e.g., MCS, rank) after comparing spectrum efficiencies. The UE 620 may drop the scheduled communication that has a tighter delay budget after comparing delay budgets. This may include prioritizing a scheduled communication that has more retransmissions. The UE 620 may drop the scheduled communication that is for a TRP with a lower throughput after comparing TRP throughputs. This may include observing the loading of a TRP, where a TRP with a lower spectral efficiency may be loaded less so that more resources can be scheduled. In some aspects, the UE 620 may drop one or both scheduled communications. For example, when the overlapping of PDSCH communications is not supported, the UE 620 may drop both PDSCH communications if there is at least partial overlapping.

In some aspects, the UE 620 may downgrade the first scheduled communication and/or the second scheduled communication. Downgrading may include modulating or demodulating parts of a scheduled communication that are not overlapping with another scheduled communication, and not modulating or demodulating parts of a scheduled communication that are overlapping with another scheduled communication. For example, with spatial layer collisions (same DMRS port used by the two scheduled communications), the UE 620 may demodulate the non-colliding spatial layers and collect the log likelihood ratios (LLRs). In some aspects, downgrading a scheduled communication may include changing a physical uplink shared channel (PUSCH) grant for the scheduled communication to a PUCCH grant. For example, if the UE 620 is not able to transmit a PUCCH communication and a PUSCH communication, but there is first PUCCH grant and a second PUCCH grant, the UE 620 may upgrade one of the PUCCH grants to a PUSCH grant. The UE 620 may then down-grade back to two PUCCH grants (e.g., ignore an uplink grant or operate as if the uplink grant is not decoded).

After a down-grade, the transmission/reception may fall back in UE capability. The dropping approaches may be considered to be special cases of down-grading, where one or both scheduled communications are down-graded to cancellation. Downgrading may have different interpretation for different collisions. For example, if the UE 620 cannot receive overlapping scheduled communications, the UE 620 may down-grade to receive each scheduled communication over the non-overlapping parts only. As a result, the non-overlapping parts are not polluted by the other scheduled communication.

In some aspects, instead of having a single resource assigned and expecting the UE 620 to detect a scheduling collision and drop a scheduled communication, the UE 620 may be configured with multiple candidate resources for an uplink communication. TRP 605 and/or TRP 610 may schedule multiple resources for one transmission. The UE 620 may selectively transmit the first scheduled communication and/or the second scheduled communication by selecting an additional transmission resource and transmitting the first scheduled communication and the second scheduled communication using the additional transmission resource. The additional transmission resources can be shared by multiple UEs, with a probability that each UE may use the additional transmission resource due to a scheduling collision. The sharing of the resources allows for more efficient use of the resources.

As indicated above, FIG. 6 is provided as an example. Other examples may differ from what is described with respect to FIG. 6.

FIG. 7 is a diagram illustrating an example process 700 performed, for example, by a UE, in accordance with the present disclosure. Example process 700 is an example where the UE (e.g., UE 120, UE 620) performs operations associated with handling scheduling collisions with multiple TRPs.

As shown in FIG. 7, in some aspects, process 700 may include receiving a first scheduling message from a first TRP and a second scheduling message from a second TRP (block 710). For example, the UE (e.g., using reception component 802 and/or communication manager 806, depicted in FIG. 8) may receive a first scheduling message from a first TRP and a second scheduling message from a second TRP, as described above.

As further shown in FIG. 7, in some aspects, process 700 may include detecting a scheduling collision based at least in part on a first scheduled communication of the first scheduling message and a second scheduled communication of the second scheduling message overlapping in time (block 720). For example, the UE (e.g., using communication manager 806, depicted in FIG. 8) may detect a scheduling collision based at least in part on a first scheduled communication of the first scheduling message and a second scheduled communication of the second scheduling message overlapping in time, as described above.

As further shown in FIG. 7, in some aspects, process 700 may include selectively transmitting one or more of the first scheduled communication or the second scheduled communication based at least in part on the detecting the scheduling collision (block 730). For example, the UE (e.g., using transmission component 804 and/or communication manager 806, depicted in FIG. 8) may selectively transmit one or more of the first scheduled communication or the second scheduled communication based at least in part on the detecting the scheduling collision, as described above.

Process 700 may include additional aspects, such as any single aspect or any combination of aspects described below and/or in connection with one or more other processes described elsewhere herein.

In a first aspect, the UE is configured to expect that scheduling collisions can occur between multiple TRPs.

In a second aspect, alone or in combination with the first aspect, detecting the scheduling collision includes detecting the scheduling collision further based at least in part on a capability of the UE for handling messages that overlap in time.

In a third aspect, alone or in combination with one or more of the first and second aspects, the first scheduling message includes a first DCI, and the second scheduling message includes a second DCI.

In a fourth aspect, alone or in combination with one or more of the first through third aspects, the first scheduling message includes a first RRC message, and the second scheduling message includes DCI.

In a fifth aspect, alone or in combination with one or more of the first through fourth aspects, the DCI overrides an earlier RRC message from the second TRP that scheduled a communication.

In a sixth aspect, alone or in combination with one or more of the first through fifth aspects, selectively transmitting the one or more of the first scheduled communication or the second scheduled communication includes transmitting the second scheduled communication rather than the first scheduled communication, based at least in part on a priority of the second scheduled communication.

In a seventh aspect, alone or in combination with one or more of the first through sixth aspects, the first scheduling message includes a first RRC message, and the second scheduling message includes a second RRC message.

In an eighth aspect, alone or in combination with one or more of the first through seventh aspects, selectively transmitting the one or more of the first scheduled communication or the second scheduled communication includes dropping or downgrading one or more of the first scheduled communication or the second scheduled communication.

In a ninth aspect, alone or in combination with one or more of the first through eighth aspects, dropping or downgrading one or more of the first scheduled communication or the second scheduled communication includes dropping one or more of the first scheduled communication or the second scheduled communication.

In a tenth aspect, alone or in combination with one or more of the first through ninth aspects, dropping one or more of the first scheduled communication or the second scheduled communication includes dropping the first scheduled communication or the second scheduled communication based at least in part on a result of a comparison of a priority of the first TRP and a priority of the second TRP.

In an eleventh aspect, alone or in combination with one or more of the first through tenth aspects, dropping one or more of the first scheduled communication or the second scheduled communication includes dropping the first scheduled communication or the second scheduled communication based at least in part on a rule for selecting a communication for transmission.

In a twelfth aspect, alone or in combination with one or more of the first through eleventh aspects, dropping one or more of the first scheduled communication or the second scheduled communication includes dropping the first scheduled communication or the second scheduled communication based at least in part on a result of a comparison of a priority of the first scheduled communication and a priority of the second scheduled communication.

In a thirteenth aspect, alone or in combination with one or more of the first through twelfth aspects, dropping one or more of the first scheduled communication or the second scheduled communication includes dropping the first scheduled communication or the second scheduled communication based at least in part on a result of a comparison of a spectrum efficiency of the first scheduled communication and a spectrum efficiency of the second scheduled communication.

In a fourteenth aspect, alone or in combination with one or more of the first through thirteenth aspects, dropping one or more of the first scheduled communication or the second scheduled communication includes dropping the first scheduled communication or the second scheduled communication based at least in part on a result of a comparison of a delay budget for the first scheduled communication and a delay budget for the second scheduled communication.

In a fifteenth aspect, alone or in combination with one or more of the first through fourteenth aspects, dropping one or more of the first scheduled communication or the second scheduled communication includes dropping the first scheduled communication or the second scheduled communication based at least in part on a result of a comparison of a throughput of the first TRP and a throughput of the second TRP.

In a sixteenth aspect, alone or in combination with one or more of the first through fifteenth aspects, dropping one or more of the first scheduled communication or the second scheduled communication includes dropping both the first scheduled communication and the second scheduled communication.

In a seventeenth aspect, alone or in combination with one or more of the first through sixteenth aspects, dropping or downgrading one or more of the first scheduled communication or the second scheduled communication includes downgrading one or more of the first scheduled communication or the second scheduled communication.

In an eighteenth aspect, alone or in combination with one or more of the first through seventeenth aspects, downgrading one or more of the first scheduled communication or the second scheduled communication includes demodulating parts of one or more of the first scheduled communication or the second scheduled communication that are not overlapping, and not demodulating the parts that are overlapping.

In a nineteenth aspect, alone or in combination with one or more of the first through eighteenth aspects, downgrading one or more of the first scheduled communication or the second scheduled communication includes changing the first scheduling message or the second scheduling message from a PUSCH grant to a PUCCH grant.

In a twentieth aspect, alone or in combination with one or more of the first through nineteenth aspects, selectively transmitting one or more of the first scheduled communication or the second scheduled communication includes selecting an additional transmission resource, and transmitting the first scheduled communication and the second scheduled communication using the additional transmission resource.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
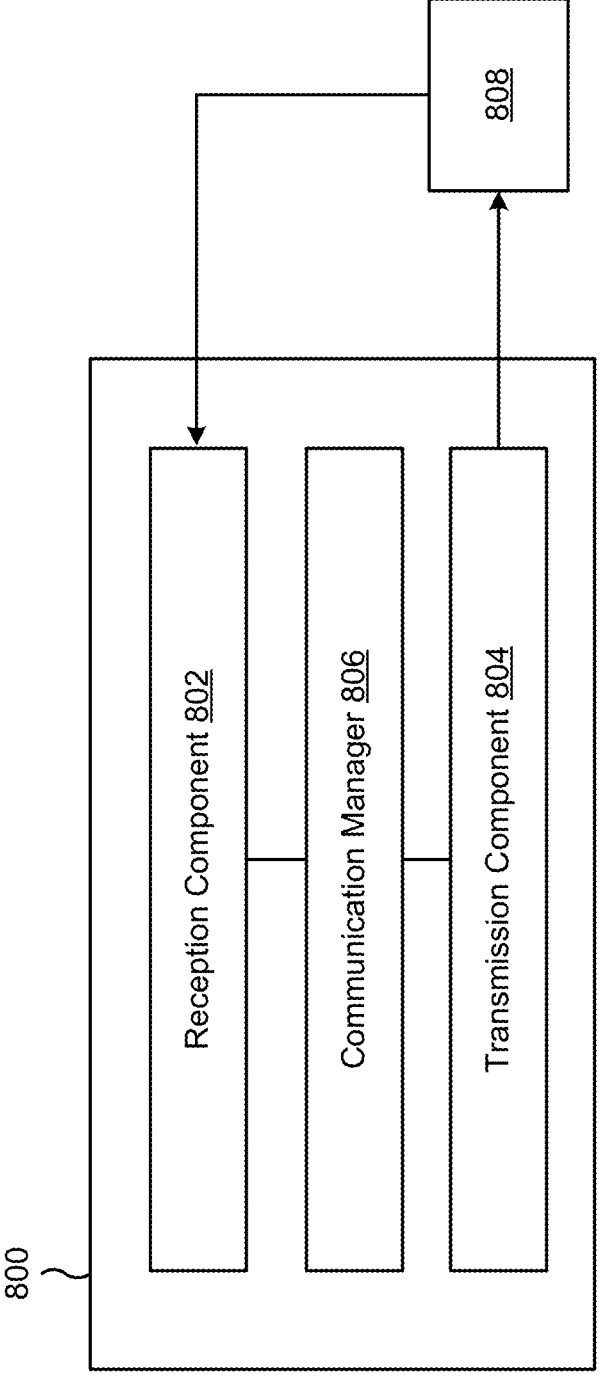
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE (e.g., UE 120, UE 620), or a UE may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIGS. 1-6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The reception component 802 may receive a first scheduling message from a first TRP and a second scheduling message from a second TRP. The communication manager 806 may detect a scheduling collision based at least in part on a first scheduled communication of the first scheduling message and a second scheduled communication of the second scheduling message overlapping in time. The transmission component 804 may selectively transmit one or more of the first scheduled communication or the second scheduled communication based at least in part on the detecting the scheduling collision.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a first scheduling message from a first transmit receive point (TRP) and a second scheduling message from a second TRP; detecting a scheduling collision based at least in part on a first scheduled communication of the first scheduling message and a second scheduled communication of the second scheduling message overlapping in time; and selectively transmitting one or more of the first scheduled communication or the second scheduled communication based at least in part on the detecting the scheduling collision.

Aspect 2: The method of Aspect 1, wherein the UE is configured to expect that scheduling collisions can occur between multiple TRPs.

Aspect 3: The method of any of Aspects 1-2, wherein detecting the scheduling collision includes detecting the scheduling collision further based at least in part on a capability of the UE for handling messages that overlap in time.

Aspect 4: The method of any of Aspects 1-3, wherein the first scheduling message includes a first downlink control information (DCI), and the second scheduling message includes a second DCI.

Aspect 5: The method of any of Aspects 1-3, wherein the first scheduling message includes a first radio resource control (RRC) message, and the second scheduling message includes downlink control information (DCI).

Aspect 6: The method of Aspect 5, wherein the DCI overrides an earlier RRC message from the second TRP that scheduled a communication.

Aspect 7: The method of Aspect 5, wherein selectively transmitting the one or more of the first scheduled communication or the second scheduled communication includes transmitting the second scheduled communication rather than the first scheduled communication, based at least in part on a priority of the second scheduled communication.

Aspect 8: The method of any of Aspects 1-3, wherein the first scheduling message includes a first radio resource control (RRC) message, and the second scheduling message includes a second RRC message.

Aspect 9: The method of any of Aspects 1-8, wherein selectively transmitting the one or more of the first scheduled communication or the second scheduled communication includes dropping or downgrading one or more of the first scheduled communication or the second scheduled communication.

Aspect 10: The method of Aspect 9, wherein dropping or downgrading one or more of the first scheduled communication or the second scheduled communication includes dropping one or more of the first scheduled communication or the second scheduled communication.

Aspect 11: The method of Aspect 10, wherein dropping one or more of the first scheduled communication or the second scheduled communication includes dropping the first scheduled communication or the second scheduled communication based at least in part on a result of a comparison of a priority of the first TRP and a priority of the second TRP.

Aspect 12: The method of Aspect 10, wherein dropping one or more of the first scheduled communication or the second scheduled communication includes dropping the first scheduled communication or the second scheduled communication based at least in part on a rule for selecting a communication for transmission.

Aspect 13: The method of Aspect 10, wherein dropping one or more of the first scheduled communication or the second scheduled communication includes dropping the first scheduled communication or the second scheduled communication based at least in part on a result of a comparison of a priority of the first scheduled communication and a priority of the second scheduled communication.

Aspect 14: The method of Aspect 10, wherein dropping one or more of the first scheduled communication or the second scheduled communication includes dropping the first scheduled communication or the second scheduled communication based at least in part on a result of a comparison of a spectrum efficiency of the first scheduled communication and a spectrum efficiency of the second scheduled communication.

Aspect 15: The method of Aspect 10, wherein dropping one or more of the first scheduled communication or the second scheduled communication includes dropping the first scheduled communication or the second scheduled communication based at least in part on a result of a comparison of a delay budget for the first scheduled communication and a delay budget for the second scheduled communication.

Aspect 16: The method of Aspect 10, wherein dropping one or more of the first scheduled communication or the second scheduled communication includes dropping the first scheduled communication or the second scheduled communication based at least in part on a result of a comparison of a throughput of the first TRP and a throughput of the second TRP.

Aspect 17: The method of Aspect 10, wherein dropping one or more of the first scheduled communication or the second scheduled communication includes dropping both the first scheduled communication and the second scheduled communication.

Aspect 18: The method of Aspect 9, wherein dropping or downgrading one or more of the first scheduled communication or the second scheduled communication includes downgrading one or more of the first scheduled communication or the second scheduled communication.

Aspect 19: The method of Aspect 18, wherein downgrading one or more of the first scheduled communication or the second scheduled communication includes demodulating parts of one or more of the first scheduled communication or the second scheduled communication that are not overlapping, and not demodulating the parts that are overlapping.

Aspect 20: The method of Aspect 18, wherein downgrading one or more of the first scheduled communication or the second scheduled communication includes changing the first scheduling message or the second scheduling message from a physical uplink shared channel grant to a physical uplink control channel grant.

Aspect 21: The method of any of Aspects 1-20, wherein selectively transmitting one or more of the first scheduled communication or the second scheduled communication includes: selecting an additional transmission resource; and transmitting the first scheduled communication and the second scheduled communication using the additional transmission resource.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive a first scheduling message from a first transmit receive point (TRP) and a second scheduling message from a second TRP;
      detect a scheduling collision based at least in part on a first scheduled communication of the first scheduling message and a second scheduled communication of the second scheduling message overlapping in time;
      select an additional transmission resource; and
      transmit the first scheduled communication and the second scheduled communication using the additional transmission resource.

2. The UE of claim 1, wherein the UE is configured to expect that scheduling collisions can occur between multiple TRPs.

3. The UE of claim 1, wherein the one or more processors, to detect the scheduling collision, are configured to detect the scheduling collision further based at least in part on a capability of the UE for handling messages that overlap in time.

4. The UE of claim 1, wherein the first scheduling message includes a first downlink control information (DCI), and the second scheduling message includes a second DCI.

5. The UE of claim 1, wherein the first scheduling message includes a first radio resource control (RRC) message, and the second scheduling message includes downlink control information (DCI).

6. The UE of claim 5, wherein the DCI overrides an earlier RRC message from the second TRP that scheduled a communication.

7. The UE of claim 1, wherein the first scheduling message includes a first radio resource control (RRC) message, and the second scheduling message includes a second RRC message.

8. A method of wireless communication performed by a user equipment (UE), comprising:
   receiving a first scheduling message from a first transmit receive point (TRP) and a second scheduling message from a second TRP;
   detecting a scheduling collision based at least in part on a first scheduled communication of the first scheduling message and a second scheduled communication of the second scheduling message overlapping in time;

selecting an additional transmission resource; and transmitting the first scheduled communication and the second scheduled communication using the additional transmission resource.

9. A non-transitory computer-readable medium storing a set of instructions for wireless communication, the set of instructions comprising:

one or more instructions that, when executed by one or more processors of a user equipment (UE), cause the UE to:

receive a first scheduling message from a first transmit receive point (TRP) and a second scheduling message from a second TRP;

detect a scheduling collision based at least in part on a first scheduled communication of the first scheduling message and a second scheduled communication of the second scheduling message overlapping in time;

select an additional transmission resource; and transmit the first scheduled communication and the second scheduled communication using the additional transmission resource.

10. An apparatus for wireless communication, comprising:

means for receiving a first scheduling message from a first transmit receive point (TRP) and a second scheduling message from a second TRP;

means for detecting a scheduling collision based at least in part on a first scheduled communication of the first scheduling message and a second scheduled communication of the second scheduling message overlapping in time;

means for selecting an additional transmission resource; and means for transmitting the first scheduled communication and the second scheduled communication using the additional transmission resource.

* * * * *